(12) United States Patent
Huang et al.

(10) Patent No.: US 9,798,367 B2
(45) Date of Patent: Oct. 24, 2017

(54) CONTROLLING SUPPLY OF POWER TO COMPUTING DEVICES WITH DYNAMICALLY VARIABLE ENERGY CAPACITY

(71) Applicant: Intel Corporation, Santa Clara, CA (US)

(72) Inventors: Lilly Huang, Portland, OR (US); Wayne L. Proefrock, Hillsboro, OR (US); Krishnan Ravichandran, Saratoga, CA (US); Bernd Nordhausen, Singapore (SG); Frank K. Welch, Jr., Fort Lauderdale, FL (US); John G. Tompkins, Portland, OR (US); Vaibhav Vaidya, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 13/859,704

(22) Filed: Apr. 9, 2013

(65) Prior Publication Data

US 2014/0304528 A1 Oct. 9, 2014

(51) Int. Cl.
*G06F 1/00* (2006.01)
*G06F 1/26* (2006.01)
(Continued)

(52) U.S. Cl.
CPC .................. *G06F 1/26* (2013.01); *G06F 1/28* (2013.01); *G06F 1/305* (2013.01); *H02J 1/14* (2013.01);
(Continued)

(58) Field of Classification Search
CPC .......... G06F 1/26; G06F 1/3203; G06F 1/3206
See application file for complete search history.

(56) References Cited

U.S. PATENT DOCUMENTS

2004/0148060 A1 7/2004 Lee et al.
2005/0046467 A1 3/2005 Kase et al.
(Continued)

FOREIGN PATENT DOCUMENTS

DE WO2008154755 A2 * 12/2008 ............... G06F 1/26
JP 2010-032747 A 2/2010
(Continued)

OTHER PUBLICATIONS

International Search Report and Written Opinion received for PCT Patent Application No. PCT/US2014/033521, dated Aug. 7, 2014, 12 Pages.
(Continued)

*Primary Examiner* — Jaweed A Abbaszadeh
*Assistant Examiner* — Austin Hicks
(74) *Attorney, Agent, or Firm* — Alpine Technology Law Group LLC

(57) ABSTRACT

Methods and apparatus relating to controlling the supply of power to computing devices with dynamically variable energy capacity are described. In one embodiment, logic causes modification to supply of power from a power source to one or more loads in response to a comparison of an output of the power source and a threshold value. The output of the power source may vary over a time period (e.g., oscillating) that causes the one or more loads to become inoperational. Other embodiments are also disclosed and claimed.

28 Claims, 11 Drawing Sheets

(51) Int. Cl.
  *G06F 1/28* (2006.01)
  *G06F 1/30* (2006.01)
  *H02M 3/158* (2006.01)
  *H02J 1/14* (2006.01)
  *H02M 1/00* (2006.01)

(52) U.S. Cl.
  CPC .... *H02M 3/1582* (2013.01); *H02M 2001/008* (2013.01)

(56) References Cited

U.S. PATENT DOCUMENTS

| | | | |
|---|---|---|---|
| 2005/0229016 A1* | 10/2005 | Addy | G06F 1/30 713/300 |
| 2009/0127932 A1* | 5/2009 | Warren et al. | 307/64 |
| 2009/0172056 A1* | 7/2009 | Pradhan et al. | 708/255 |
| 2010/0176778 A1 | 7/2010 | Lin et al. | |
| 2011/0080143 A1* | 4/2011 | Parakulam et al. | 320/162 |

FOREIGN PATENT DOCUMENTS

| | | |
|---|---|---|
| JP | 2010-057262 A | 3/2010 |
| JP | 2010-117744 A | 5/2010 |
| JP | 2012-195991 A | 10/2012 |
| JP | 2013-055819 A | 3/2013 |
| TW | 201027314 A1 | 7/2010 |
| WO | 2014/169051 A1 | 10/2014 |

OTHER PUBLICATIONS

Communication received for European Patent Application No. 14783283.6, dated Nov. 29, 2016, 1 page.
European Search Report received for European Patent Application No. 14783283.6, dated Nov. 11, 2016, 9 pages.
Office Action received for Chinese Patent Application No. 201480013321.3, dated Dec. 30, 2017, 15 pages including 7 pages of English translation.
Office Action received for Chinese Patent Application No. 201480013321.3 dated Aug. 17, 2017, 17 pages including 11 pages of English Translation.

\* cited by examiner

CONTROLLING SUPPLY OF POWER TO COMPUTING DEVICES WITH DYNAMICALLY VARIABLE ENERGY CAPACITY

FIELD

The present disclosure generally relates to the field of electronics. More particularly, an embodiment of the invention relates to controlling the supply of power to computing devices with dynamically variable energy capacity.

BACKGROUND

In some parts of the world (such as emerging countries which include large parts of Africa, Asia, and South America), an AC (Alternating Current) power grid may only be available to a portion of the population and many parts, such as the rural countryside, may lack access to such a power grid. These are also typically the areas where access to education is most lacking and where Classmate Personal Computers (CMPCs) are most in demand. While governments in such countries may be willing to provide the necessary funding to supply the computers, such computing resources would still be useless without access to an operating power grid.

One solution is to utilize solar power where access to the power grid is absent or impractical. However, today's CMPC devices cannot be charged by a solar source directly without the use of a complex kit that may include a solar panel, a battery, battery charger, and other electronics to regulate the supplied voltage. And, the cost of these solutions is almost as much as the cost of the CMPC itself and, moreover, they are not safe for use by children due to the presence of large batteries (e.g., lead acid).

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
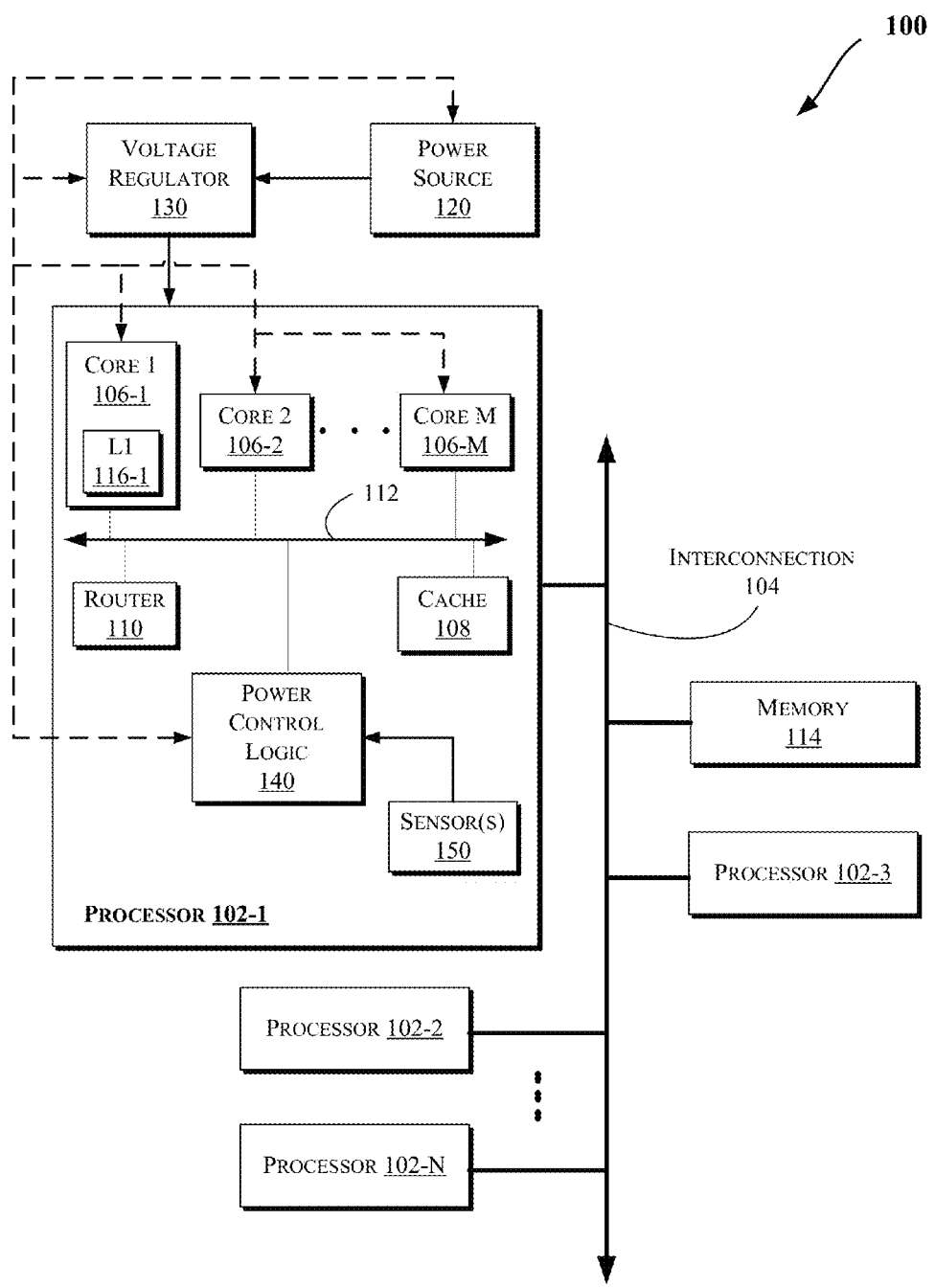
FIGS. 1 and 10-12 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As discussed previously, today's CMPC devices cannot be charged by a solar source directly without the use of a complex kit that may include a solar panel, a battery, battery charger, and other electronics to regulate the supplied voltage. And, the cost of these solutions is almost as much as the cost of the CMPC itself and, moreover, they are not safe for use by children due to the presence of large batteries (e.g., lead acid).

An alternative method is to connect the solar panel directly to the CMPC (e.g., to address the cost and safety issue), but this is not electrically practical because the CMPC product is currently designed in such a way that it accepts a power supply only as a fixed voltage (for example, 19V) and the supply current must be over a certain limit (e.g., greater than about 2.0 A). Any power source which does not fit into these power envelopes would be unusable. Moreover, the characteristics of a raw solar panel (or Photo Voltaic (PV) panel) output, unfortunately, do not fit such an envelope. Namely, the voltage of PV panel is not a constant and typically ranges from 0V to 20+V due to solar radiation and orientation. And, the power available (or current) from PV panel depends on environment (such as sun radiation and/or temperature) as well as loading conditions. This implies that the PV panel's output current can be lower than a certain pre-set threshold (e.g., ~2.0 A in the example above). Moreover, the input voltage (also current and/or power) would be unstable (i.e., fluctuating). This certainly degrades performance due to its average low power input to the system, but a more serious problem is the resulting long-term reliability or damage to platform components such as battery or batteries.

Furthermore, problems causing the unexpected "power oscillation" or "unstable supply voltage" is inherited from the design of system power delivery in CMPC today. The system is, in the first place, designed and built to meet specific system requirements. Specifically, the PC (Personal Computer) system (battery charger IC (Integrated Circuit)) is pre-set or "programmed" with fixed values of AC/DC (Alternating Current/Direct Current) adaptor current limit (I_ADP), battery charger current setting (I_CHG), and battery charge voltage (V_CHG). By default, such a condition is always met by choosing a proper AC/DC adaptor and a correct battery pack set. However, if a power supply does not meet such pre-defined requirements, the PC system runs into a malfunction state.

For example, if the maximum supply current is less than the I_ADP (the value of adaptor current predefined in CMPC), as a load is connected to the source, the supply voltage to the load will be dragged down in order to maintain the output power within the power capability of a supply. As soon as the supply voltage drops down to the level of the "under voltage" limit of battery Charger IC, a protection circuit on the platform will "kick" in and then shut down the system. However, the system will automatically restart again as the supply voltage goes beyond the limit due to presence of a low load. This is a root cause of "power oscillation" discussed above. Such undesired process/scenarios would repeat indefinitely under today's CMPC. This is similar or the same as when a solar panel (as alternative power source) is connected directly to CMPC as a replacement for AC/DC adaptor. Harvested energy from a solar panel is constantly varying depending on many factors (such as sun radiation, temperature, etc.). Hence, when the available power from the energy source is below a threshold (for example, I_ADP), then the PC system will run into the unstable power state.

To this end, some embodiments manage the power distribution path (from a source to a load) in such a way that an alternative power source (such as a PV panel, wind generator, thermal generator, water/hydro turbine, etc.) is coupled to a system load (e.g., one or more components of a CMPC or another type of computing device/PC, mobile device, tablet, smart phone, laptop, Ultrabook, UMPC (Ultra Mobile PC), smart watch, smart pair of wearable glasses, smart helmet, etc.) if certain requirements are satisfied. For example, the requirements could be that the amount/level of harvested/generated energy is sufficient or high enough to supply the power demand from the coupled load(s). In this way, the undesired scenario of "power oscillation" (or variability of the generated voltage/current/power over a given period of time such as between about 100 mS (millisecond) and about 1 S (second), e.g., depending on the device and/or the power source) appeared at the input of the system can be prevented or at least sufficiently reduced to allow for correct functionality.

Also, while some embodiments may be discussed with reference to solar power, one or more other power sources (e.g., with or without power oscillation issues) may also be used, in addition to or instead of the solar power, such as discussed herein in various embodiments. Further, while some embodiments are discussed with reference to CMPCs, the techniques discussed herein may be readily applied to any type of computing device/PC/system/platform, including for example a mobile device, tablet, smart phone, Ultrabook, UMPC (Ultra Mobile PC), smart watch, smart glasses, smart helmets, etc., which may include an integrated touch screen or multi-touch display.

In one embodiment, a power controller (PWCT) is coupled between an alternative power source (such as a PV panel) and a computing system (such as CMPC or other mobile device/PC). The input of PWCT can receive any type of alternative power source. Its output is a supply with regulated voltage provided to the CMPC. The PWCT may deliver power to the PC only when the available power at the input of PWCT is large enough to meet the load demand. Otherwise, the power path from the source to the PC system is "turned off".

Moreover, some embodiments may be applied in computing systems that include one or more processors (e.g., with one or more processor cores), such as those discussed with reference to FIGS. 1-12. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 10-12), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a direct current (DC) power source or an alternating current (AC) power source) to provide power to one or more components of the system 100. The power source 120 could include a PV panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (e.g., coupled to an AC power grid), etc.) and/or plug-in power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 to control supply of power to components of the processor 102 (e.g., cores 106). Logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120.

For example, the logic 140 may be coupled to receive information (e.g., in the form of one or more bits or signals)

to indicate status of one or more sensors 150. The sensor(s) 150 may be provided proximate to components of system 100 (or other computing systems discussed herein such as those discussed with reference to other figures including 10-12, for example), such as the cores 106, interconnections 104 or 112, components outside of the processor 102, etc., to sense variations in various factors affecting power/thermal behavior of the system/platform, such as temperature, solar radiation, wind speed, water flow, operating frequency, operating voltage, power consumption, and/or inter-core communication activity, etc.

The logic 140 may in turn instruct the VR 130, power source 120, and/or individual components of system 100 (such as the cores 106) to modify their operations. For example, logic 140 may indicate to the VR 130 and/or power source 120 (or PSU) to adjust their output. In some embodiments, logic 140 may request the cores 106 to modify their operating frequency, power consumption, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, outside of computing device/system (e.g., as a stand-alone device), coupled to (or integrated with) the power source 120, etc. Furthermore, as shown in FIG. 1, the power source 120 and/or the voltage regulator 130 may communicate with the power control logic 140 and report their power specification. Hence, in an embodiment, logic 140 is an intelligent power controller with voltage translation, under-power and over-voltage protections.

Figure 2:
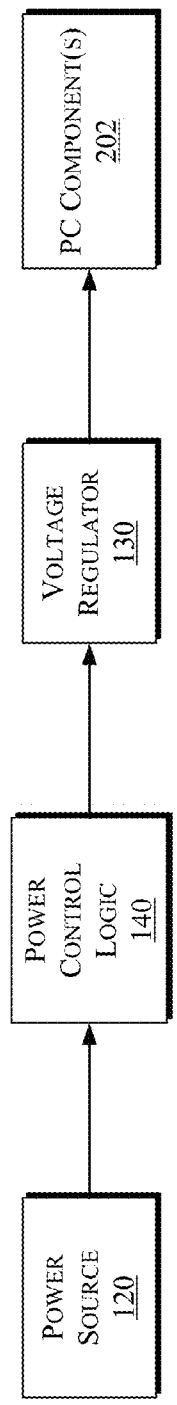
FIG. 2 illustrates a block diagram of computing system components, according to some embodiments.

FIG. 2 illustrates a block diagram of a power management system, according to an embodiment. As shown, a power controller (PWCT) such as logic 140 of FIG. 1 is coupled between an (e.g., alternative) power source (such as a PV panel, wind generator, thermal generator water/hydro turbine, etc.) and a computing system (such as CMPC or other mobile device/PC component(s) 202). The input of PWCT 140 can receive any type of alternative power source. Its output is a supply with regulated voltage (e.g., through the VR 130 of FIG. 1) provided to the PC 202. The PWCT may deliver power to the PC only when the available power at the input of PWCT 140 is large enough to meet the load demand (i.e., the electrical load posed by one or more PC components 202). Otherwise, the power path from the source to the PC system is "turned off". In some implementations, the output of the source 120 may be less than 25V and 40 W maximum, or about 5V to 36V and 40 W maximum. The output of the VR 130 may be about 16V to 19V, with a current of greater than about 2 A. In an embodiment, the logic 140 may cause turning of the supply of power to the PC component(s) only as the output and/or current of the source 120 reach predefined threshold values.

As mentioned above, in an embodiment, logic 140 is an intelligent power controller with voltage translation, under-power and over-voltage protections. The proposed "intelligent power source controller" allows for one or more of the following. It detects on-the-fly both available power of the energy source and total load demand of the electronic device. Then, the power distribution path is determined (and "re-configured") based on the power/load detection and per-defined conditions. For example, if the available power can only supply one mobile device, then the rest of system (other devices) will not be powered even though they may be physically connected (for example, through power supply cables). By doing so, it will avoid the system voltage oscillation due to insufficient power.

Figure 6:
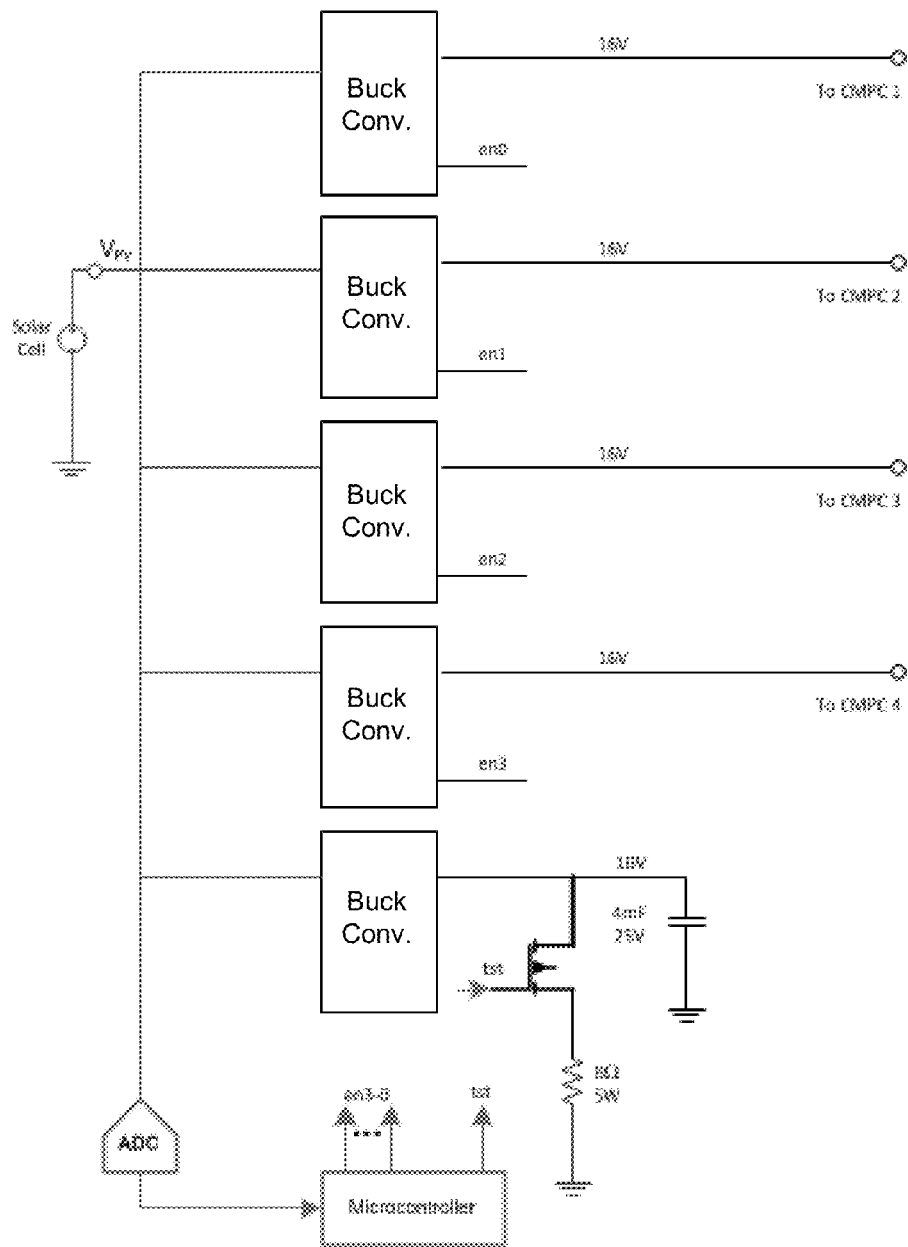
Figure 7:
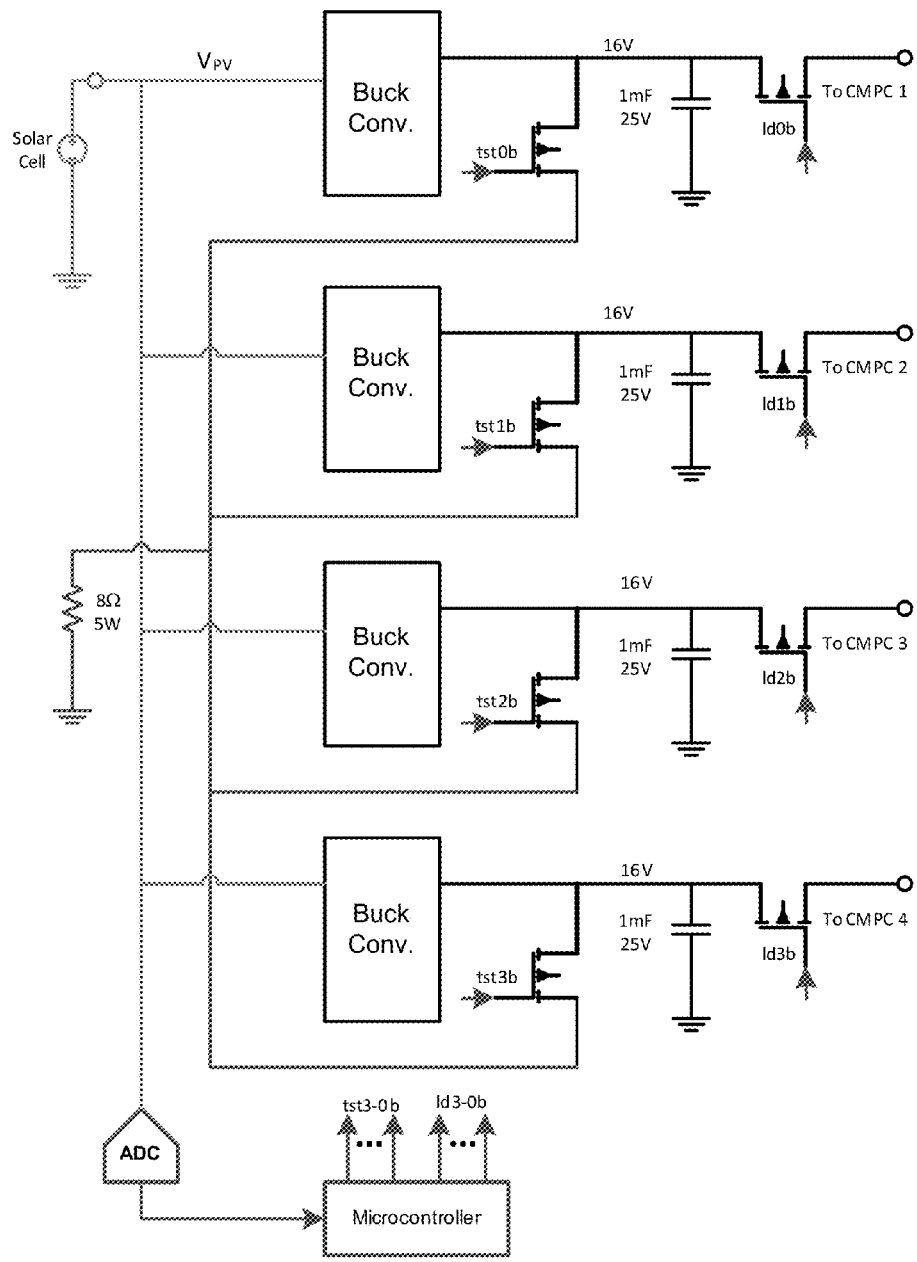

In some embodiments, an intermediate adapter is designed, with some knowledge of the electronic load device (e.g., laptop, cell phone, tablet, or Classmate PC). The adapter is protected against any reasonable over-voltage at its input, allowing a variety of sources (Solar panels of varying voltage are a good example) to be connected to the adapter in the field. The adapter provides one or more regulated voltages to its outputs using high efficiency DC-DC converters (as shown in FIG. 6 or 7, for example), in order to supply the given electronic load. Since most portable electronic devices such as laptops and cell phones run on one, two, or three stack batteries, this regulated voltage can be designed to be generic. In turn, each regulated voltage output has a power rating. The adapter is thus able to supply any load within this power rating. One limitation placed on the input source is maximum voltage, to ensure the adapter is not destroyed. This maximum voltage maybe significantly larger than common operating voltages of the loads.

In one embodiment, the above-mentioned adapter operates under the principle of sufficient available power. Starting from no loads turned on, the adapter periodically adds an internal test load which is equal to the power rating of one output. If the input voltage remains above a value required to sustain the DC-DC converters at the power rating of the additional load, the adapter turns on an additional output. Thus at any point in time when there is sufficient power to sustain an additional load, it will be enabled. Conversely, if the input voltage falls below a voltage required to sustain the DC-DC converters at the current power demand level, the adapter will continue to disable its outputs one by one until the power drawn is lower than the available power.

Some embodiments also add delays to the control of the system depending on the ability of the passive storage elements in the circuit to supply energy and depending on the response-times of the output and voltage regulators. The passive storage elements in the circuit and delays in control make the adapter less dependent on characteristics of the input source and stabilize the operation of the adapter, protecting the electronic devices. Further, one implementation of the adapter that considers the electronic loads to be CMPCs. Implementations of the adapter for laptops, cell phones, tablets and other computing/mobile devices would be similar, with a change of power and voltage ratings. Component names and electrical values are for illustration only and do not represent a limitation or requirement of this design.

Figure 3:
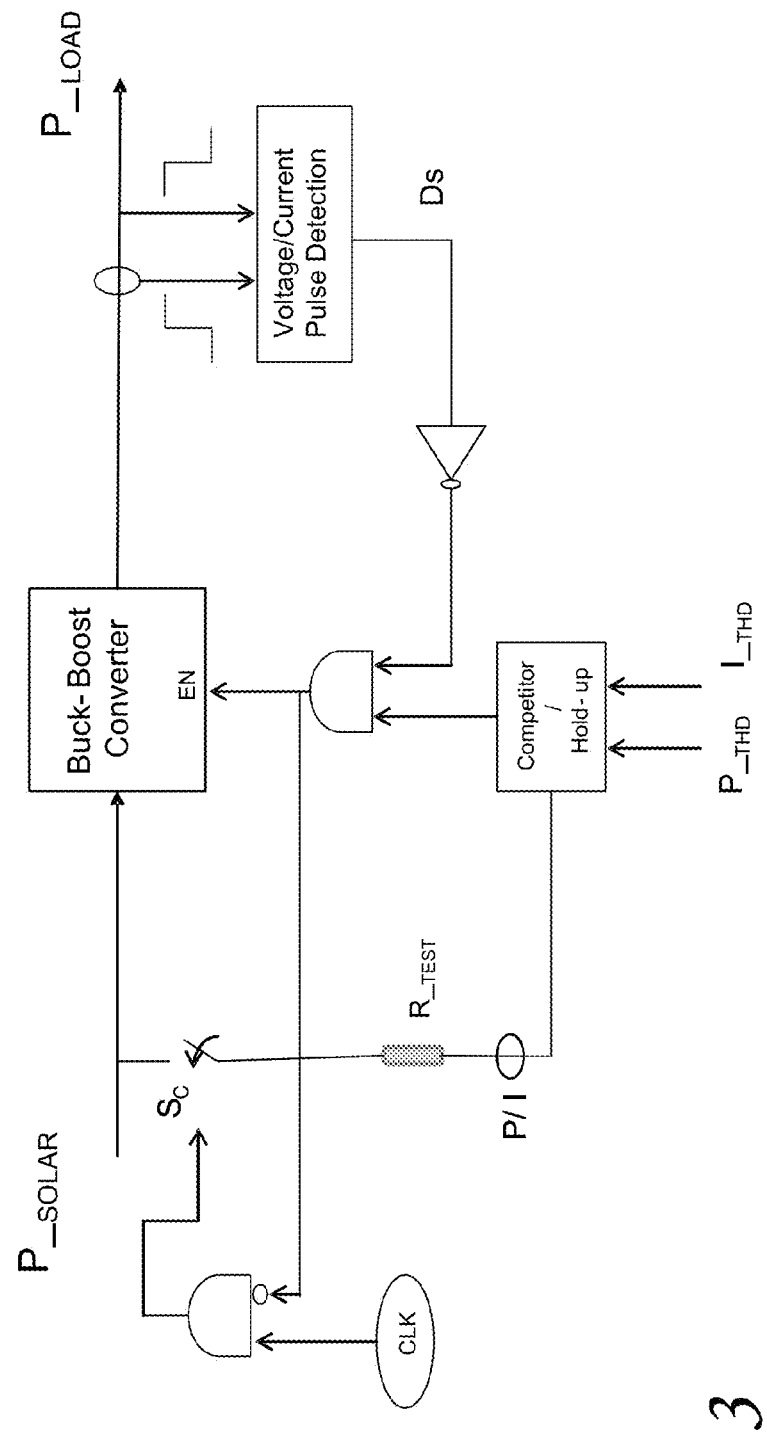
FIGS. 3 and 5-7 illustrate circuit diagrams, according to some embodiments.

FIG. 3 illustrates a circuit diagram of one possible circuit design to realize the techniques discussed with reference to FIG. 2, according to an embodiment. The terms shown in FIG. 3 include:

(1) P_SOLAR—Input power from a solar source (or other power source with "oscillating" power issues, for example)
(2) P_LOAD—Output power to a load
(3) CLK—Clock signal
(4) Sc—Switcher control signal
(5) P_THD, I_THD—threshold values for power, current
(6) Ds—output detection indicating its functionality
(7) P/I—power, current
(8) R_test—resistor for test
(9) EN—enable function/output of converter (where a buck boost converter generally refers to a type of DC-to-DC converter that has an output voltage magnitude that is either greater than or less than the input voltage magnitude)

Figure 4:
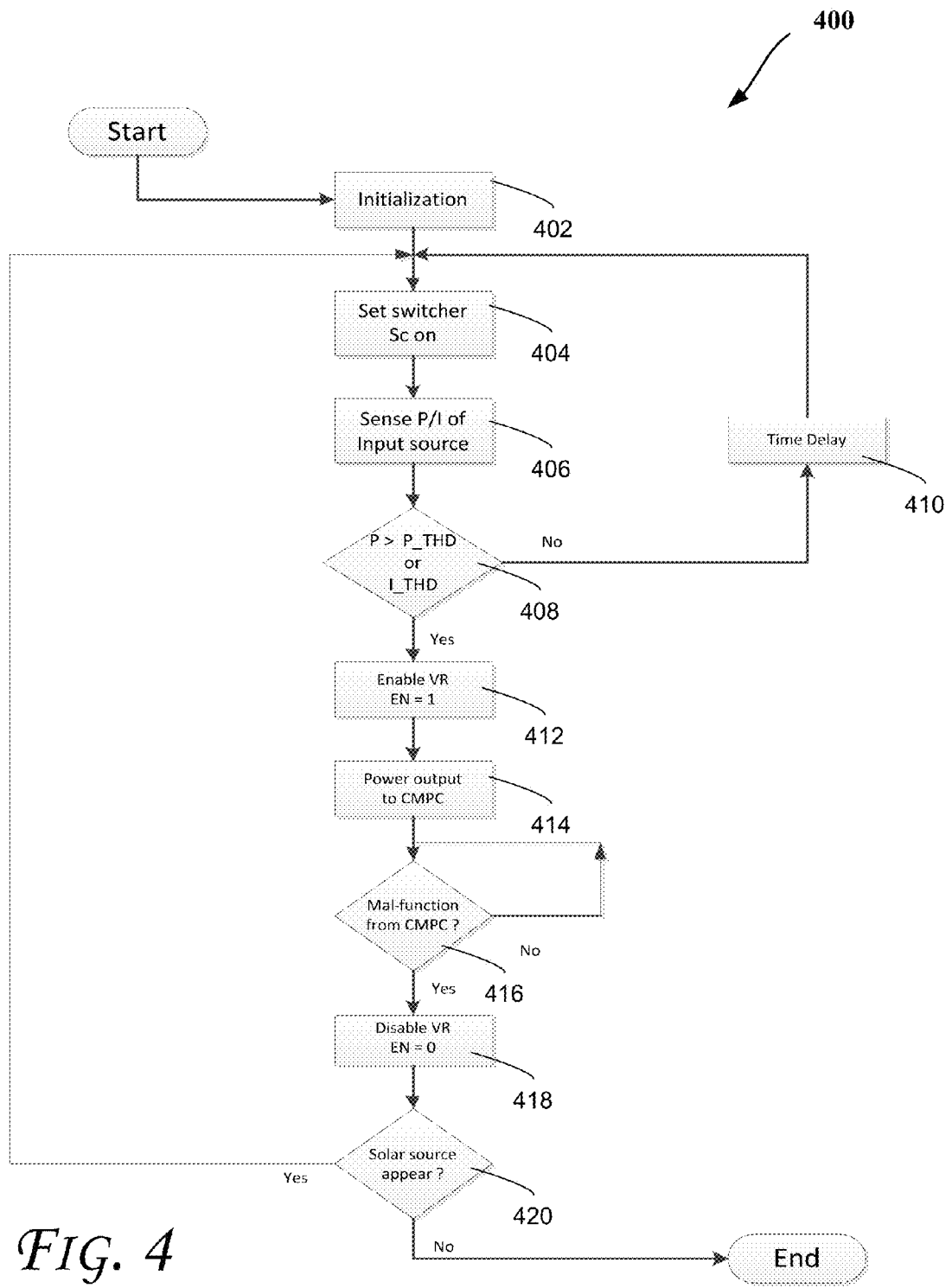
FIGS. 4 and 8-9 illustrates flow diagrams, according to some embodiments.

FIG. 4 illustrates a flow diagram of an embodiment of a method 400 to provide/control provision of electrical power from a solar panel with a single PC, according to an embodiment. In an embodiment, various components discussed with reference to FIGS. 1-3 and 10-12 (including for example logic 140) may be utilized to perform one or more of the operations discussed with reference to FIG. 4. Also, while some embodiments may be discussed with reference to solar power, one or more other power sources (e.g., with or without power oscillation issues) may also be used, in addition to or instead of the solar power, such as discussed herein in various embodiments.

Referring to FIGS. 1-4, at an operation 402, initialization is performed (e.g., including write I_ADP, ICHG, etc. into a register, disable converter-Off). At an operation 404, a coupling/connection is made, e.g., source test load, R_test (Sc On). At an operation 406, the power P or current I is sensed through R_test. At operation 408, if P<P_THD or I<I_THD (the threshold values defined), the method returns to the operation 404 (with some desired time delay at operation 410). Otherwise (for example, if I>I_THD), operation 412 couples the source to PC (e.g., by setting EN=1) to provide power to PC component(s) at operation 414. Voltage/current input at the input of PC is sensed and monitored, and if the system power supply behaves normally, the method continues with operation 416. Once the system power supply runs into the "oscillation" in voltage or power or current (as determined at operation 416), the power controller/converter (e.g., VR 130 and/or buck boost converter shown in FIG. 3) is disabled (e.g., by setting EN=0) at operation 418. If the power source 120 is present (i.e., generating power), the method returns to operation 404; otherwise, the method ends (e.g., since there is no power source connected/generating power).

Figure 5:
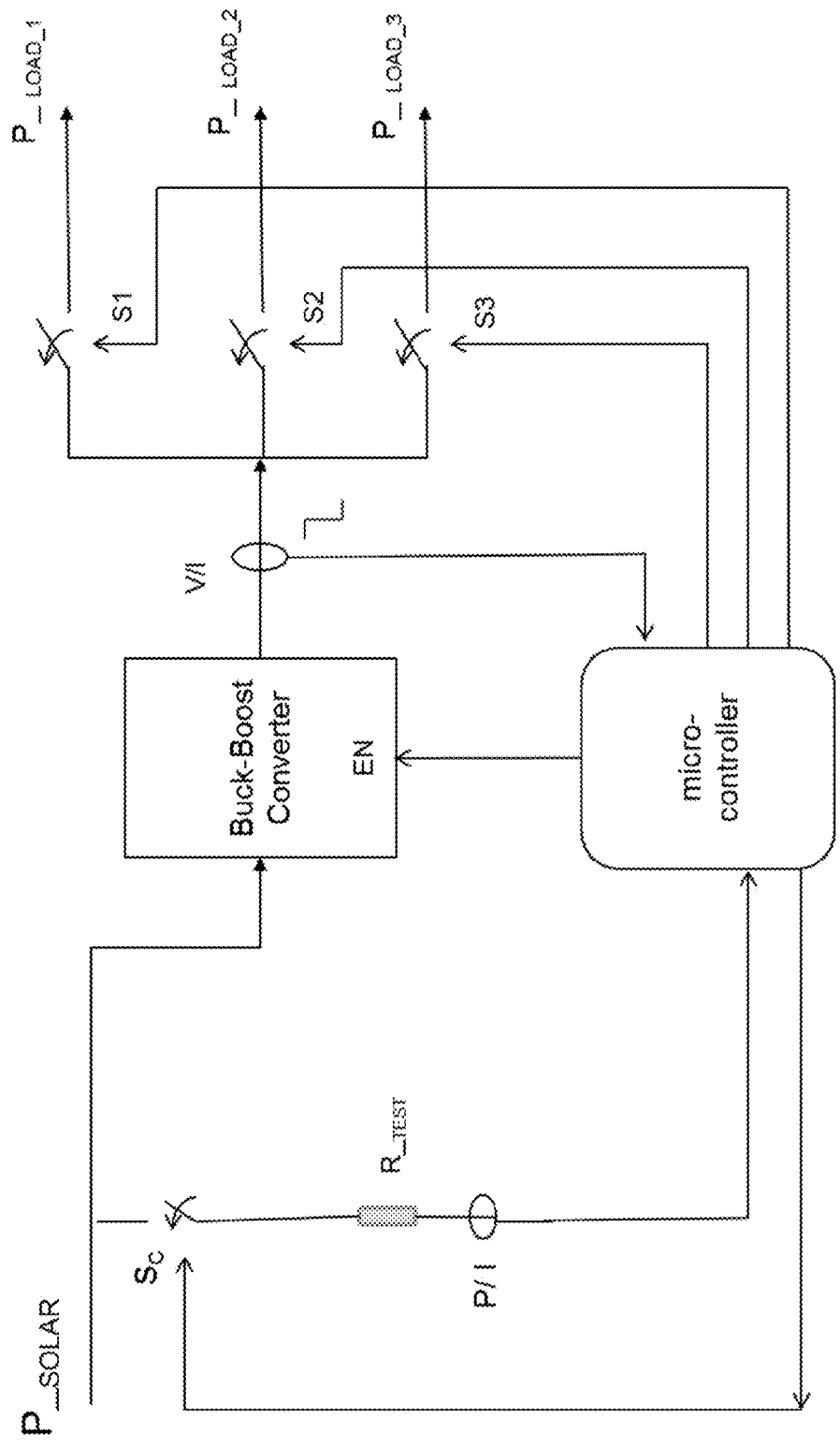

FIG. 5 illustrates a circuit diagram of another possible circuit design to control provision of power to multiple loads, according to an embodiment. Moreover, in some of application scenarios, multiple CMPCs may be coupled to a single alternative power source. For example, one solar panel powers up to three (or some other number of) CMPCs simultaneously. As shown (e.g., relative to the FIG. 3 circuit), some of the circuitry is replaced by a microcontroller (or a processor or processor core such as discussed herein with reference to FIGS. 10-12) and switches S1, S2, and S3 are used to control the flow of power to respective loads.

Another alternative circuit is shown in FIG. 6, according to an embodiment, where multiple buck boost converters are utilized in parallel to provide power to a plurality of PCs. As shown in FIG. 6, the microcontroller generates the enable signals for each of the converters and a test signal for a test buck converter (the bottom converter in FIG. 6) based on sensed input from the solar cell. Moreover, in some embodiments, the PV cell may generate Voc of about 21V minimum, with maximum power (or Pmax) of about 80 W, the buck converter may include input and output L-C (Inductor-Capacitor) components, where the shown capacitor may be an additional 4 mF capacitor (which can handle a voltage at maximum of 16V), and the load switch (e.g., S1, S2, etc.) includes a single FET (Field Effect Transistor) with less than 500 mW Ron (and associated driver), the test resistor is 8 W, 1 W-5 W that can sustain peak power at 32 W for 1 mse, for example. FIG. 7 illustrates another possible circuit diagram, where multiple buck boost converters are utilized in parallel to provide power to a plurality of PCs.

More particularly, the circuit of FIG. 7 is similar to the circuit discussed with reference to FIG. 6, except that each stage of buck boost converter is not coupled to its respective load via a capacitor and two transistors (that are controlled via signals generated by the microcontroller as shown), instead of using an enable signal provided to the converters directly (as done in FIG. 6).

Figure 8:
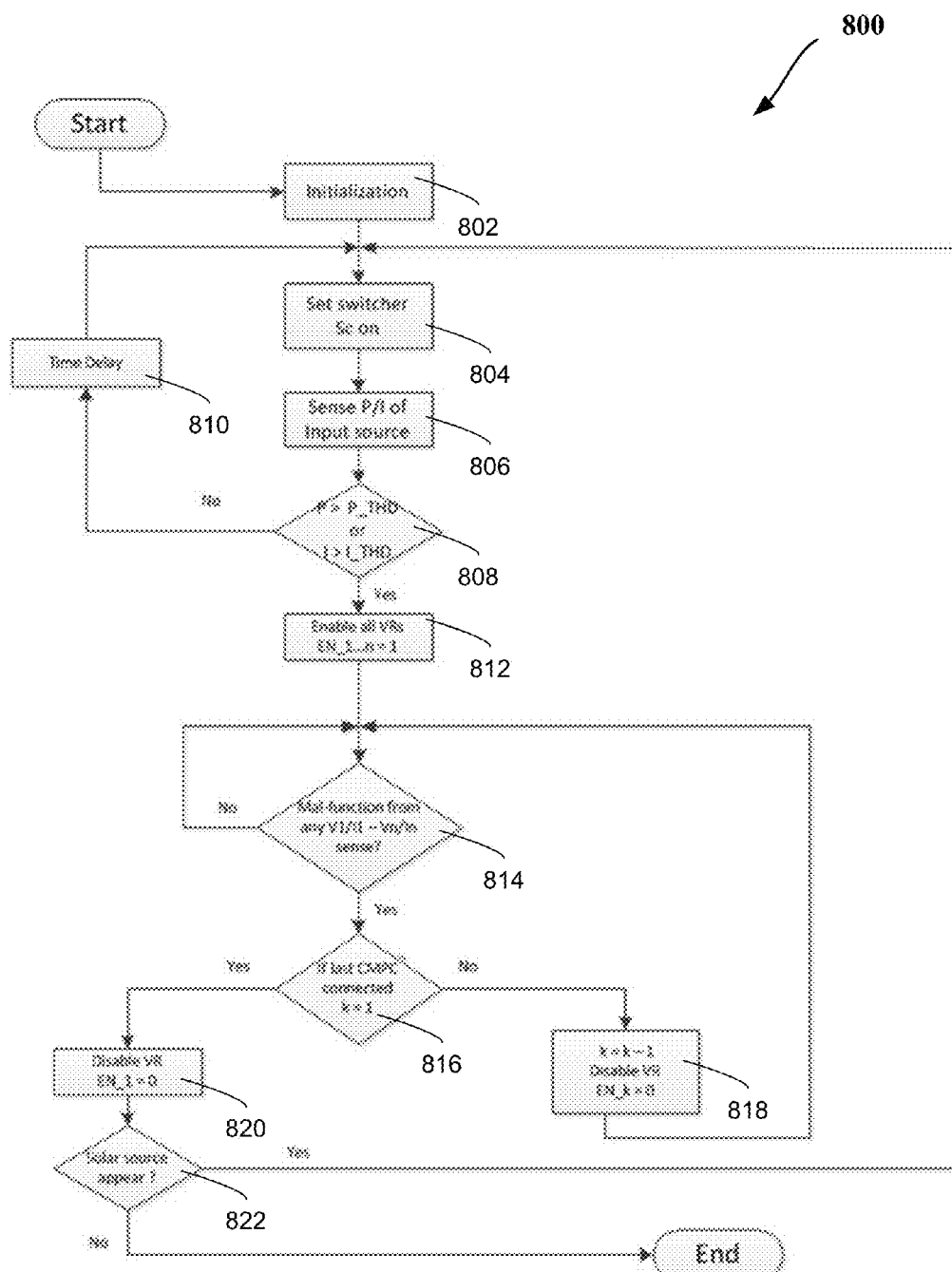

FIG. 8 illustrates a flow diagram of an embodiment of a method 800 to provide/control provision of electrical power from a single solar panel to a plurality of PCs as discussed with reference to FIGS. 5-7, according to an embodiment. In an embodiment, various components discussed with reference to FIGS. 1-7 and 10-12 (including for example logic 140) may be utilized to perform one or more of the operations discussed with reference to FIG. 8. Also, while some embodiments may be discussed with reference to solar power, one or more other power sources (e.g., with or without power oscillation issues) may also be used, in addition to or instead of the solar power, such as discussed herein in various embodiments.

Referring to FIG. 8, operations 802-810 and 822 shown follow a similar path as operations 402-410 and 422 discussed with reference to FIG. 4. At an operation 812, all VRs are enabled. At an operation 814, it is determined whether mal-function is sensed (e.g., for any V1/I1 to Vn/In). If not, method 800 continues with operation 814; otherwise, it is determined whether the last CMPC is connected at operation 816. If not, an operation 818 disables each VR one by one per an index (k) that is updated (e.g., decremented) by operation 818. Once the last CMOC is connected, an operation 820 disables the VR.

Figure 9:
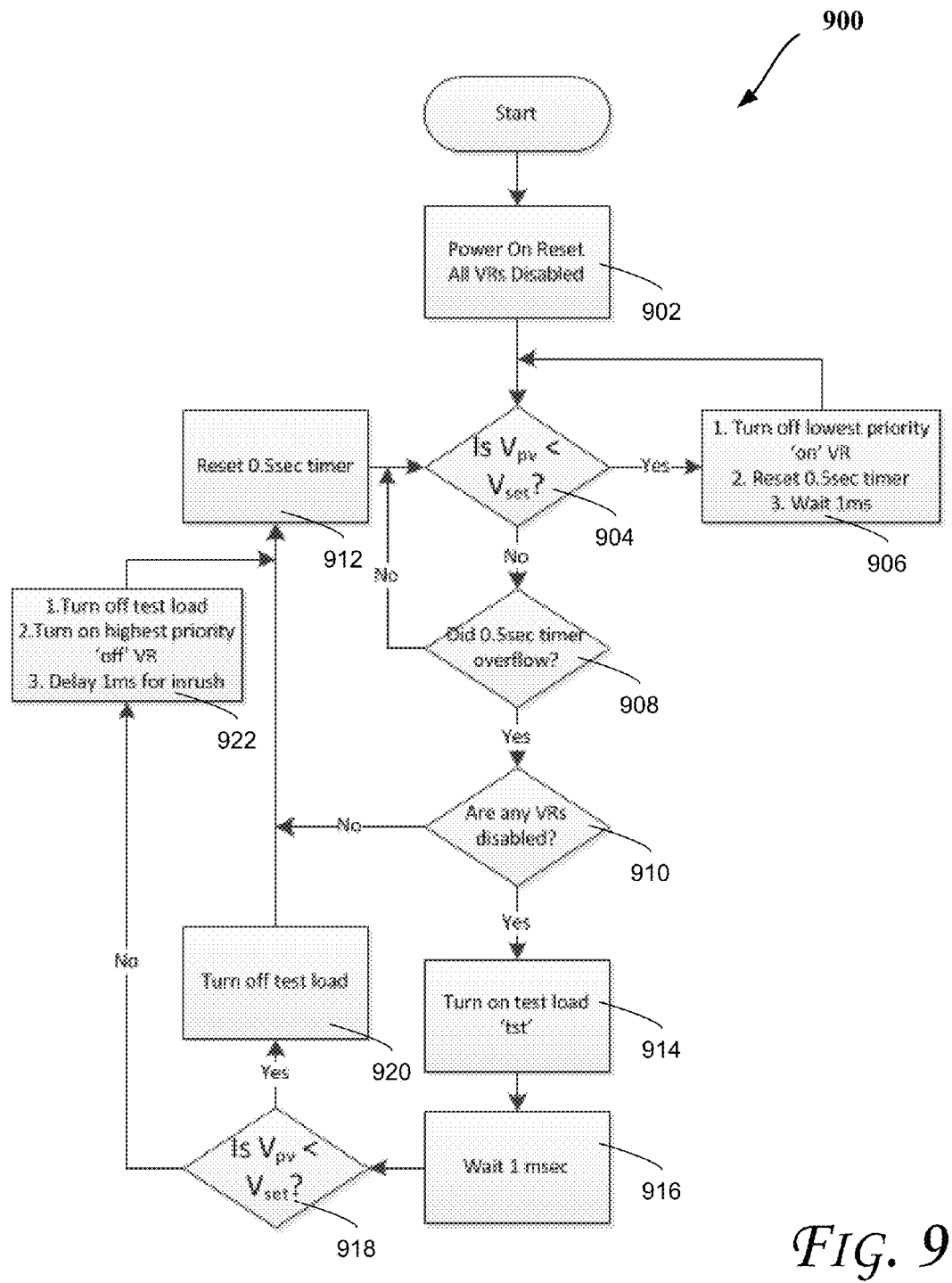

FIG. 9 illustrates a flow diagram of an embodiment of a method 900 to operate a microcontroller such as those discussed with reference to FIGS. 5-6B, according to an embodiment. In an embodiment, various components discussed with reference to FIGS. 1-8 and 10-12 (including for example logic 140) may be utilized to perform one or more of the operations discussed with reference to FIG. 9. Also, while some embodiments may be discussed with reference to solar power, one or more other power sources (e.g., with or without power oscillation issues) may also be used, in addition to or instead of the solar power, such as discussed herein in various embodiments.

Referring to FIGS. 1-9, at an operation 902, a power on reset is performed (e.g., all VRs are disabled). At operation 904, it is determined whether $V_{pv}$ (cell voltage or output of the solar PV) is below the required voltage for the buck converter(s) (Vset). If it is below the Vset, an operation 906 turns off the lowest priority VR that is powered on, resets a timer (e.g., at 0.5 sec), and waits for an threshold period of time (e.g., 1 ms). If $V_{pv}$ is not below Vset, an operation 908 determines whether the timer (e.g., of operations 906 and/or 910) has overflow and if not return to operation 904. Otherwise, an operation 910 determines if there are any VRs disabled and if not an operation 912 resets the timer (e.g., for 0.5 sec). Otherwise, the test load is turned on at operation 914 followed by a delay (e.g., for 1 ms) at operation 916. An operation 918 determines whether $V_{pv}$ is below Vset, and if so, the test load is turned off at operation 920. Otherwise, operation 922 turns off the test load, turns on the highest priority VR that is turned off, and waits for a delay period (e.g., 1 ms for in rush configuration, for example, relating to the delay time that is inserted in the flow to handle the "in rush current" while the power supply is turned on).

Accordingly, in an embodiment, once powered on, all outputs are disabled. If sufficient input voltage is available, the test-load is turned on. If the sufficient input voltage is sustained, the test load is turned off and one output is turned on. The outputs are continually turned on until the input voltage falls below the requirement of the buck converters, or until all loads are turned on. Further testing for input voltage is done during operation.

Also, some embodiments provide independence from source characteristics, which allowing for more robustness and higher performance. One embodiment takes periodic measurements of the source itself, disconnecting it from the power train temporarily. Taking the source offline requires the use of a large capacitance to sustain power to loads during source disconnection, which is avoided by the 'online' measurements provided in accordance with some embodiments (such as discussed with reference to FIG. 9). Also, once the measurements are done, heuristic predictions and calculations may be used to arrive at an expected power availability number from the source, which decides how many loads can be turned on. Variations in the source and even poor connections to the source may invalidate the heuristics, causing erroneous states in the adapter. To this end, one embodiment only depends on power rating of the load and voltage rating of the switching converters within the adapter to decide its operating parameters, making it source independent and more robust. In addition, a single voltage measurement may be used for decision taking, which is a significant cost and complexity benefit over some implementation which may use voltage and current measurements to estimate available power. Moreover, action may be taken based on incremental power availability. Thus, if a load that is already ON is consuming less than its rated power, the additional available power potentially enables powering more loads.

In an embodiment, during start up, no CMPC are in use and starting at fresh, then each CMPC is turned on one-by-one in a sequence. If there is a CMPC already in use, users may request to "hot-plug" connect for the second, third, etc. CMPCs. If available power changes during operation (such as cloudiness during PV generation), some or all CMPCs are disconnected due to the lower energy available. If there is "malfunction" in any one of the output rails during the operation, disconnect CMPCs (in pre-defined priority order) until the normal system operation resumes. Moreover, input voltage protection may be required if input voltage is over about 25V (disconnect all VRs, for example). Also, light (e.g., via one or more LEDs (Light Emitting Diodes)) indication may be used to signal power status (on or off), input voltage being within a specified range, which may be indicated per port. Also, a small rechargeable coin cell battery may be used to power up the microcontroller and switching logic circuits so they are not dependent on other power sources.

Figure 10:
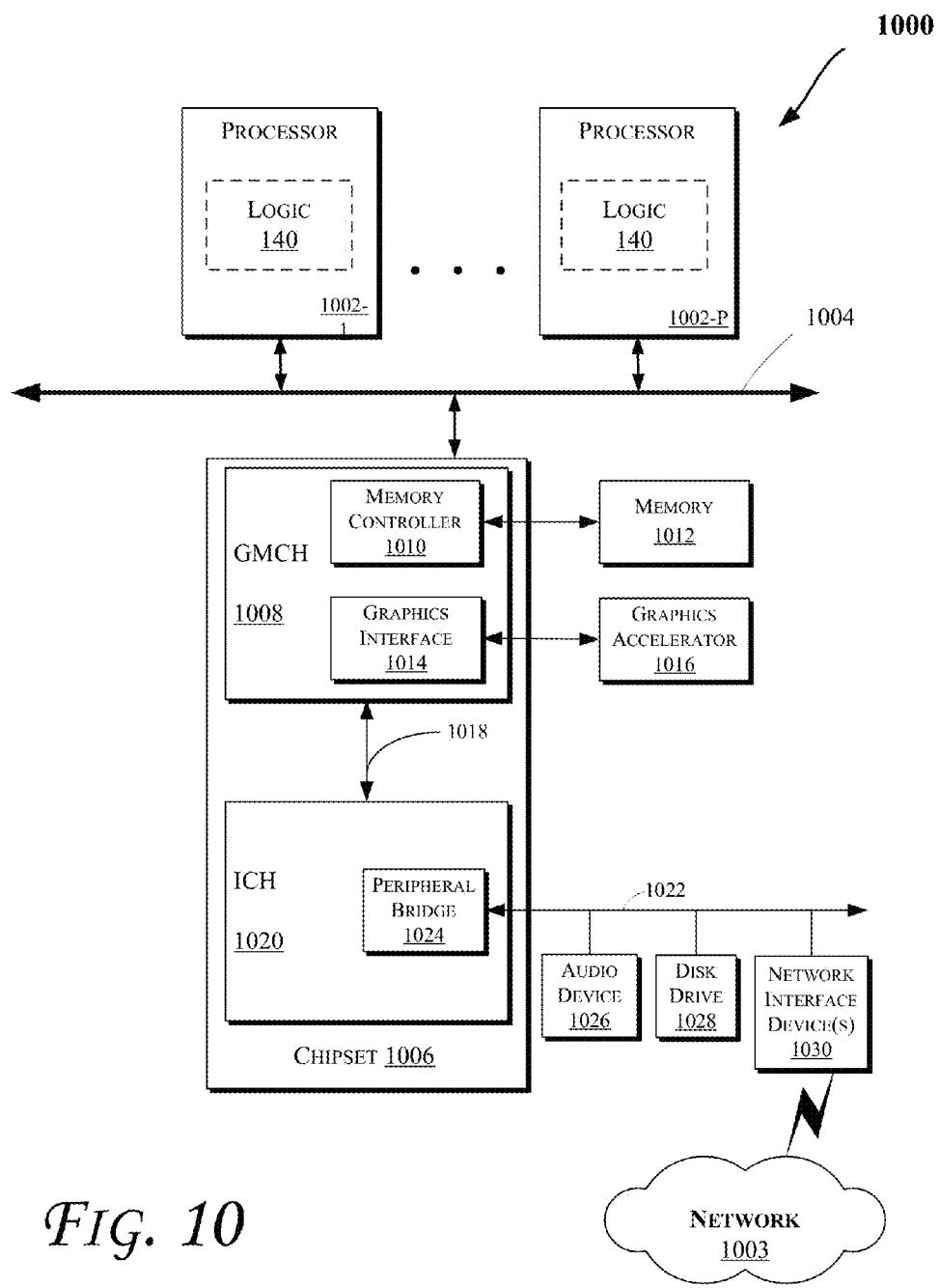

FIG. 10 illustrates a block diagram of a computing system 1000 in accordance with an embodiment of the invention. The computing system 1000 may include one or more central processing unit(s) (CPUs) or processors 1002-1 through 1002-P (which may be referred to herein as "processors 1002" or "processor 1002"). The processors 1002 may communicate via an interconnection network (or bus) 1004. The processors 1002 may include a general purpose processor, a network processor (that processes data communicated over a computer network 1003), or other types of a processor (including a reduced instruction set computer (RISC) processor or a complex instruction set computer (CISC)). Moreover, the processors 1002 may have a single or multiple core design. The processors 1002 with a multiple core design may integrate different types of processor cores on the same integrated circuit (IC) die. Also, the processors 1002 with a multiple core design may be implemented as symmetrical or asymmetrical multiprocessors. In an embodiment, one or more of the processors 1002 may be the same or similar to the processors 102 of FIG. 1. In some embodiments, one or more of the processors 1002 may include one or more of the cores 106, logic 140, one or more timers (such as discussed with reference to FIG. 9), and sensor(s) 150, of FIG. 1. Also, the operations discussed with reference to FIGS. 1-9 may be performed by one or more components of the system 1000. For example, a voltage regulator (such as VR 130 of FIG. 1) may regulate voltage supplied to one or more components of FIG. 10 at the direction of logic 140.

A chipset 1006 may also communicate with the interconnection network 1004. The chipset 1006 may include a graphics and memory control hub (GMCH) 1008. The GMCH 1008 may include a memory controller 1010 that communicates with a memory 1012. The memory 1012 may store data, including sequences of instructions that are executed by the processor 1002, or any other device included in the computing system 1000. In one embodiment of the invention, the memory 1012 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1004, such as multiple CPUs and/or multiple system memories.

The GMCH 1008 may also include a graphics interface 1014 that communicates with a graphics accelerator 1016. In one embodiment of the invention, the graphics interface 1014 may communicate with the graphics accelerator 1016 via an accelerated graphics port (AGP). In an embodiment of the invention, a display (such as a flat panel display (such as an LCD (Liquid Crystal Display), a cathode ray tube (CRT), a projection screen, etc.) may communicate with the graphics interface 1014 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 1018 may allow the GMCH 1008 and an input/output control hub (ICH) 1020 to communicate. The ICH 1020 may provide an interface to I/O devices that communicate with the computing system 1000. The ICH 1020 may communicate with a bus 1022 through a peripheral bridge (or controller) 1024, such as a peripheral component interconnect (PCI) bridge, a universal serial bus (USB) controller, or other types of peripheral bridges or controllers. The bridge 1024 may provide a data path between the processor 1002 and peripheral devices. Other types of topologies may be utilized. Also, multiple buses may communicate with the ICH 1020, e.g., through multiple bridges or controllers. Moreover, other peripherals in communication with the ICH 1020 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1022 may communicate with an audio device 1026, one or more disk drive(s) 1028, and one or more network interface device(s) 1030 (which is in communication with the computer network 1003). Other devices may communicate via the bus 1022. Also, various components (such as the network interface device 1030) may communicate with the GMCH 1008 in some embodiments of the invention. In addition, the processor 1002 and the GMCH 1008 may be combined to form a single chip. Furthermore, the graphics accelerator 1016 may be included within the GMCH 1008 in other embodiments of the invention.

Furthermore, the computing system 1000 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1028), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 1000 may be arranged in a point-to-point (PtP) configuration. For example, processors, memory, and/or input/output devices may be interconnected by a number of point-to-point interfaces.

Figure 11:
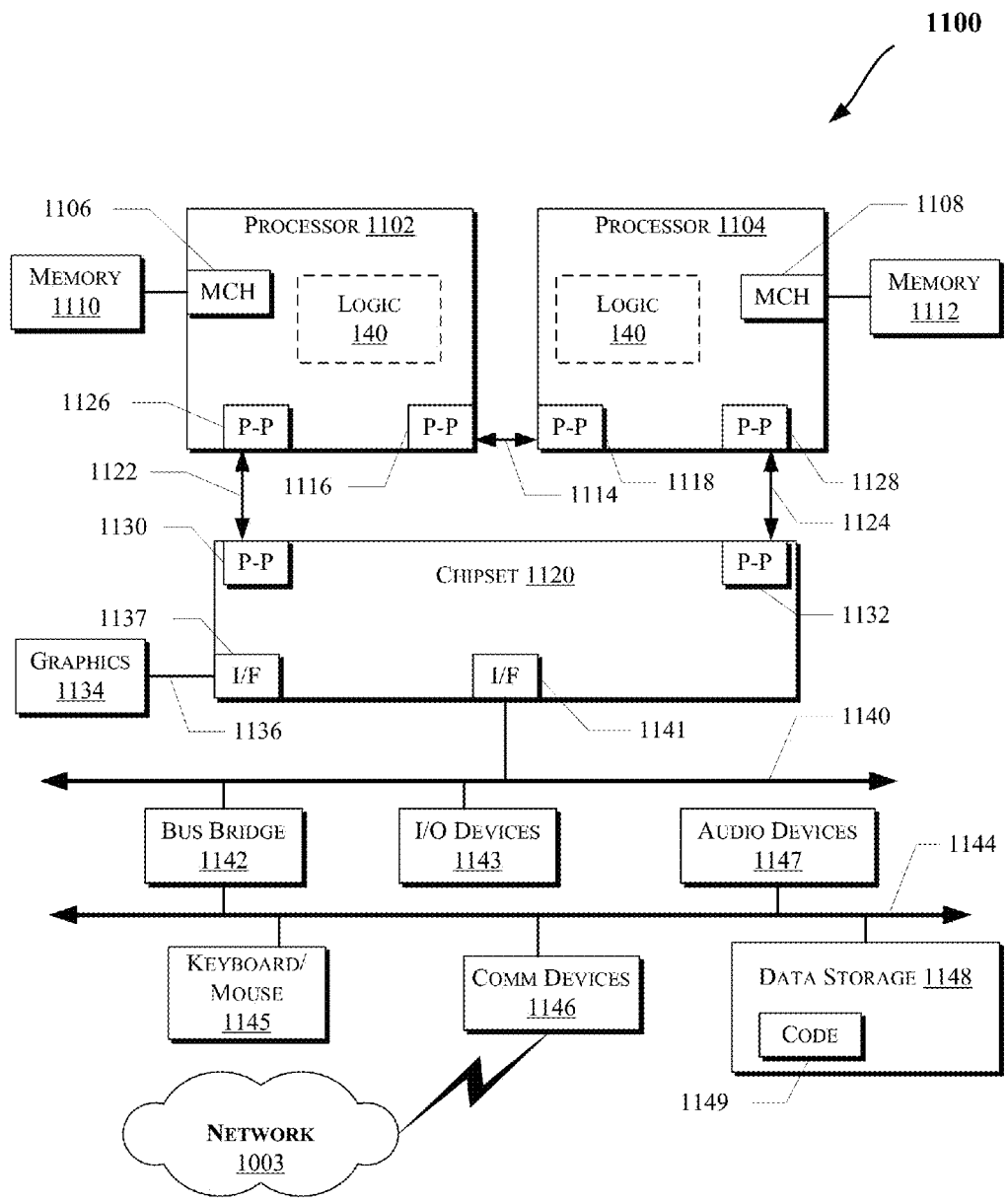

FIG. 11 illustrates a computing system 1100 that is arranged in a point-to-point (PtP) configuration, according to an embodiment of the invention. In particular, FIG. 11 shows a system where processors, memory, and input/output devices are interconnected by a number of point-to-point interfaces. The operations discussed with reference to FIGS. 1-10 may be performed by one or more components of the system 1100. For example, a voltage regulator (such as VR 130 of FIG. 1) may regulate voltage supplied to one or more components of FIG. 11.

As illustrated in FIG. 11, the system 1100 may include several processors, of which only two, processors 1102 and 1104 are shown for clarity. The processors 1102 and 1104 may each include a local memory controller hub (MCH) 1106 and 1108 to enable communication with memories 1110 and 1112. The memories 1110 and/or 1112 may store various data such as those discussed with reference to the memory 1012 of FIG. 10. Also, the processors 1102 and 1104 may include one or more of the cores 106, logic 140, one or more timers (such as discussed with reference to FIG. 9), and/or sensor(s) 150 of FIG. 1.

In an embodiment, the processors 1102 and 1104 may be one of the processors 1002 discussed with reference to FIG. 10. The processors 1102 and 1104 may exchange data via a point-to-point (PtP) interface 1114 using PtP interface circuits 1116 and 1118, respectively. Also, the processors 1102 and 1104 may each exchange data with a chipset 1120 via individual PtP interfaces 1122 and 1124 using point-to-point interface circuits 1126, 1128, 1130, and 1132. The chipset 1120 may further exchange data with a high-performance graphics circuit 1134 via a high-performance graphics interface 1136, e.g., using a PtP interface circuit 1137.

In at least one embodiment, one or more operations discussed with reference to FIGS. 1-10 may be performed by the processors 1102 or 1104 and/or other components of the system 1100 such as those communicating via a bus 1140. Other embodiments of the invention, however, may exist in other circuits, logic units, or devices within the system 1100 of FIG. 11. Furthermore, some embodiments of the invention may be distributed throughout several circuits, logic units, or devices illustrated in FIG. 11.

Chipset 1120 may communicate with the bus 1140 using a PtP interface circuit 1141. The bus 1140 may have one or more devices that communicate with it, such as a bus bridge 1142 and I/O devices 1143. Via a bus 1144, the bus bridge 1142 may communicate with other devices such as a keyboard/mouse 1145, communication devices 1146 (such as modems, network interface devices, or other communication devices that may communicate with the computer network 1003), audio I/O device, and/or a data storage device 1148. The data storage device 1148 may store code 1149 that may be executed by the processors 1102 and/or 1104.

Figure 12:
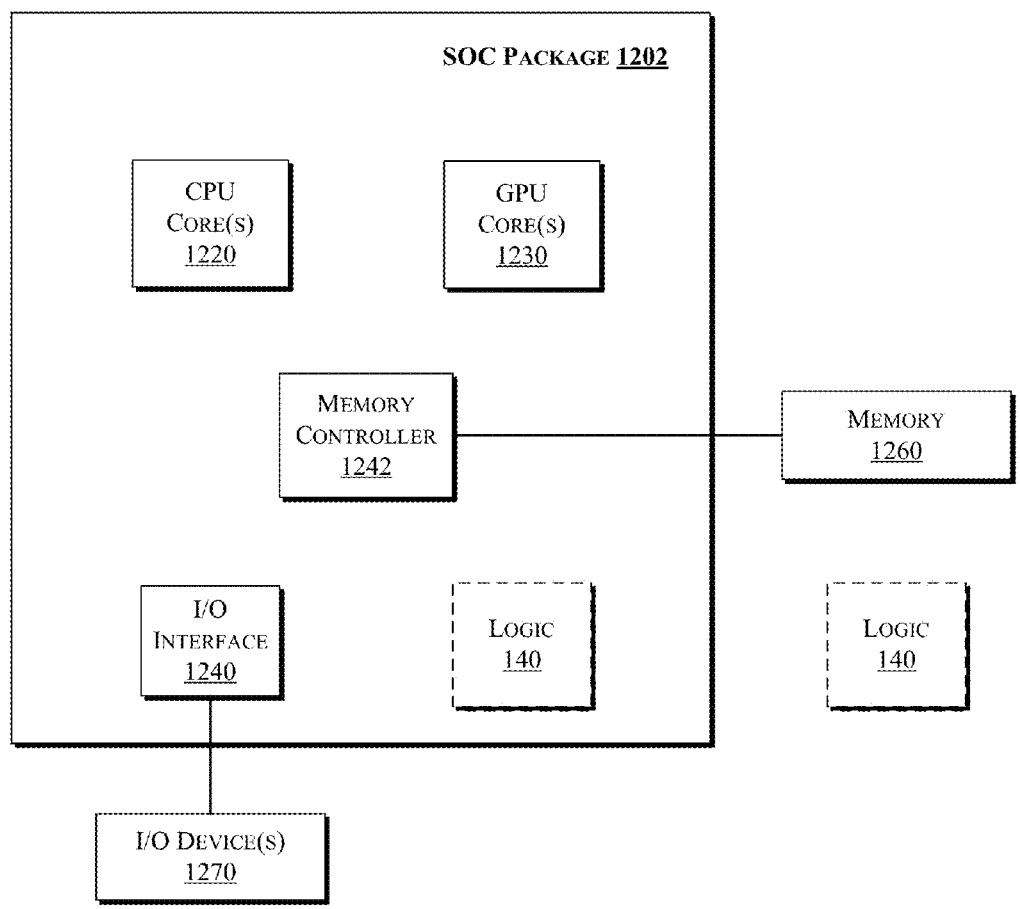

In some embodiments, one or more of the components discussed herein can be embodied as a System On Chip (SOC) device. FIG. 12 illustrates a block diagram of an SOC package in accordance with an embodiment. As illustrated in FIG. 12, SOC 1202 includes one or more Central Processing Unit (CPU) cores 1220, one or more Graphics Processor Unit (GPU) cores 1230, an Input/Output (I/O) interface 1240, and a memory controller 1242. Various components of the SOC package 1202 may be coupled to an interconnect or bus such as discussed herein with reference to the other figures. Also, the SOC package 1202 may include more or less components, such as those discussed herein with reference to the other figures. Further, each component of the SOC package 1220 may include one or more other components, e.g., as discussed with reference to the other figures herein. In one embodiment, SOC package 1202 (and its components) is provided on one or more Integrated Circuit (IC) die, e.g., which are packaged into a single semiconductor device.

As illustrated in FIG. 12, SOC package 1202 is coupled to a memory 1260 (which may be similar to or the same as memory discussed herein with reference to the other figures) via the memory controller 1242. In an embodiment, the memory 1260 (or a portion of it) can be integrated on the SOC package 1202.

The I/O interface 1240 may be coupled to one or more I/O devices 1270, e.g., via an interconnect and/or bus such as discussed herein with reference to other figures. I/O device(s) 1270 may include one or more of a keyboard, a mouse, a touchpad, a display, an image/video capture device (such as a camera or camcorder/video recorder), a touch screen, a speaker, or the like. Furthermore, SOC package 1202 may include/integrate the logic 140 in an embodiment. Alternatively, the logic 140 may be provided outside of the SOC package 1202 (i.e., as a discrete logic).

The following examples pertain to further embodiments. Example 1 includes 1 includes an apparatus comprising: logic, at least a portion of which is in hardware, to cause modification to supply of power from a power source to one or more loads based on a comparison of an output of the power source and a threshold value, wherein the output of the power source is to vary over a time period that causes the one or more loads to become inoperational. Example 2 includes the apparatus of example 1, wherein the logic is to detect both available power level of the power source and the total load demand of the one or more loads. Example 3 includes the apparatus of example 1, wherein the comparison is to be performed periodically. Example 4 includes the apparatus of example 1, further comprising one or more Direct Current (DC) to DC converters to supply the power from the power source to the one or more loads. Example 5 includes the apparatus of example 1, wherein the one or more loads are to comprise one or more components of a computing system. Example 6 includes the apparatus of example 1, wherein the one or more loads are to comprise one or more computing devices. Example 7 includes the apparatus of example 6, wherein the comparison is to be performed without having to disconnect the power source. Example 8 includes the apparatus of example 6, wherein the one or more computing devices are to comprise one or more of: a personal computer, a laptop, a mobile device, a tablet, a smart phone, an Ultrabook, an ultra mobile personal computer, a smart watch, a smart pair of glasses, and a smart helmet. Example 9 includes the apparatus of example 1, comprising logic to convert DC voltage to DC voltage, wherein the comparison is to be performed based on power loading of the one or more loads and voltage rating of the logic to convert DC voltage to DC voltage, and independent of the power source. Example 10 includes the apparatus of example 1, wherein the power source is selected from a group consisting of one or more of: a photovoltaic panel, a wind generator, a thermal generator, and a hydro turbine. Example 11 includes the apparatus of example 1, wherein the power source is to exclude an alternating current power grid. Example 12 includes the apparatus of example 1, wherein the time period is between about 100 mS and about 1 S. Example 13 includes the apparatus of example 1, further comprising a plurality of processors that are to be coupled to the power source. Example 14 includes the apparatus of example 1, further comprising one or more sensors to detect variations in one or more of: temperature, solar radiation, wind speed, water flow, operating frequency, operating voltage, and power consumption. Example 15 includes the apparatus of example 1, wherein one or more of the logic, one or more processor cores, and memory are on a single integrated circuit.

Example 16 includes a method comprising: causing modification to supply of power from a power source to one or more loads based on a comparison of an output of the power source and a threshold value, wherein the output of the power source varies over a time period that causes the one or more loads to become inoperational. Example 17 includes the method of example 16, further comprising detecting both available power level of the power source and the total load demand of the one or more loads. Example 18 includes the method of example 16, further comprising performing the comparison periodically. Example 19 includes the method of example 16, further comprising converting DC voltage to DC voltage, wherein the comparison is performed based on power loading of the one or more loads and voltage rating of the logic to convert DC voltage to DC voltage, and independent of the power source.

Example 20 includes a system comprising: a processor having one or more processor cores; and logic, at least a portion of which is in hardware, to cause modification to supply of power from a power source to the one or more processor cores based on a comparison of an output of the power source and a threshold value, wherein the output of the power source is to vary over a time period that causes the one or more processor cores to become inoperational. Example 21 includes the system of example 20, wherein the logic is to detect both available power level of the power source and the total load demand of the one or more processor cores. Example 22 includes the system of example 20, wherein the comparison is to be performed periodically. Example 23 includes the system of example 20, further comprising one or more Direct Current (DC) to DC converters to supply the power from the power source to the one or more processor cores. Example 24 includes the system of example 20, wherein the comparison is to be performed without having to disconnect the power source. Example 25 includes the system of example 20, comprising logic to convert DC voltage to DC voltage, wherein the comparison is to be performed based on power loading of the one or more processor cores and voltage rating of the logic to convert DC voltage to DC voltage, and independent of the power source.

Example 26 includes an apparatus to control supply of power to computing devices with dynamically variable energy capacity, the apparatus comprising: means for causing modification to supply of power from a power source to one or more loads based on a comparison of an output of the power source and a threshold value, wherein the output of the power source varies over a time period that causes the one or more loads to become inoperational. Example 27 includes the apparatus of example 26, comprising means for detecting both available power level of the power source and the total load demand of the one or more loads. Example 28 includes the apparatus of example 26, comprising means for performing the comparison periodically. Example 29 includes the apparatus of example 26, comprising means for converting DC voltage to DC voltage, wherein the comparison is performed based on power loading of the one or more loads and voltage rating of the logic to convert DC voltage to DC voltage, and independent of the power source.

Example 30 includes a computer-readable medium comprising one or more instructions that when executed on a processor configure the processor to perform one or more operations of any of examples 16 to 19.

In various embodiments of the invention, the operations discussed herein, e.g., with reference to FIGS. 1-12, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-12.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. An apparatus comprising:
   logic, at least a portion of which is in hardware, to cause modification to supply of power from a power source to one or more loads based at least in part on a priority of a voltage regulator and a comparison of an output of the power source and a threshold value, the voltage regulator to be coupled between the logic and the one or more loads, wherein the logic is to comprise a buck-boost converter coupled between the power source and the one or more loads, wherein the buck-boost converter is capable of generation of an output voltage that is either greater than or less than an input voltage to the buck-boost converter, wherein the buck-booster converter is to be enabled based at least in part on a comparison of a detected input current at an input to the buck-boost converter against an input current threshold value, wherein the voltage regulator is to be turned off in response to a determination that the priority of the voltage regulator is a lowest priority amongst a plurality of voltage regulators and that the power source is incapable of generating a threshold voltage level, wherein the comparison of the output of the power source and the threshold value is to be delayed for a first time period after the voltage regulator is turned off, wherein the output of the power source is to vary over a second time period that causes the one or more loads to become inoperational.

2. The apparatus of claim 1, wherein the logic is to detect both available power level of the power source and the total load demand of the one or more loads.

3. The apparatus of claim 1, wherein the comparison is to be performed periodically.

4. The apparatus of claim 1, further comprising one or more Direct Current (DC) to DC converters to supply the power from the power source to the one or more loads.

5. The apparatus of claim 1, wherein the one or more loads are to comprise one or more components of a computing system.

6. The apparatus of claim 1, wherein the one or more loads are to comprise one or more computing devices.

7. The apparatus of claim 6, wherein the comparison is to be performed without having to disconnect the power source.

8. The apparatus of claim 6, wherein the one or more computing devices are to comprise one or more of: a personal computer, a laptop, a mobile device, a tablet, a smart phone, an Ultrabook, an ultra mobile personal computer, a smart watch, a smart pair of glasses, and a smart helmet.

9. The apparatus of claim 1, comprising logic to convert DC voltage to DC voltage, wherein the comparison is to be performed based on power loading of the one or more loads and voltage rating of the logic to convert DC voltage to DC voltage, and independent of the power source.

10. The apparatus of claim 1, wherein the power source is selected from a group consisting of one or more of: a photovoltaic panel, a wind generator, a thermal generator, and a hydro turbine.

11. The apparatus of claim 1, wherein the power source is to exclude an alternating current power grid.

12. The apparatus of claim 1, wherein the second time period is between about 100 mS and about 1 S.

13. The apparatus of claim 1, further comprising a plurality of processors that are to be coupled to the power source.

14. The apparatus of claim 1, further comprising one or more sensors to detect variations in one or more of: temperature, solar radiation, wind speed, water flow, operating frequency, operating voltage, and power consumption.

15. The apparatus of claim 1, wherein one or more of the logic, one or more processor cores, and memory are on a single integrated circuit.

16. The apparatus of claim 1, wherein the voltage regulator is to be turned on in response to a determination that the priority of the voltage regulator is a highest priority amongst the plurality of voltage regulators and that the power source is capable of generating a threshold voltage.

17. The apparatus of claim 1, wherein the buck-boost converter is to be enabled based at least in part on a comparison of a detected input power at the input to the buck-boost converter against an input power threshold value.

18. The apparatus of claim 1, wherein the buck-boost converter is to run a check on the detected input current prior to a voltage regulator stage.

19. A method comprising:
causing modification to supply of power from a power source to one or more loads based at least in part on a priority of a voltage regulator and a comparison of an output of the power source and a threshold value, the voltage regulator coupled between the logic and the one or more loads, wherein the modification is to be based at least in part on operation of a buck-boost converter coupled between the power source and the one or more loads, wherein the buck-boost converter is capable of generation of an output voltage that is either greater than or less than an input voltage to the buck-boost converter, wherein the buck-booster converter is enabled based at least in part on a comparison of a detected input current at an input to the buck-boost converter against an input current threshold value, wherein the voltage regulator is turned off in response to a determination that the priority of the voltage regulator is a lowest priority amongst a plurality of voltage regulators and that the power source is incapable of generating a threshold voltage level, wherein the comparison of the output of the power source and the threshold value is delayed for a first time period after the voltage regulator is turned off, wherein the output of the power source varies over a second time period that causes the one or more loads to become inoperational.

20. The method of claim 19, further comprising detecting both available power level of the power source and the total load demand of the one or more loads.

21. The method of claim 19, further comprising performing the comparison periodically.

22. The method of claim 19, further comprising converting DC voltage to DC voltage, wherein the comparison is performed based on power loading of the one or more loads and voltage rating of the logic to convert DC voltage to DC voltage, and independent of the power source.

23. A system comprising:
a processor having one or more processor cores; and
logic, at least a portion of which is in hardware, to cause modification to supply of power from a power source to the one or more processor cores based at least in part on a priority of a voltage regulator and a comparison of an output of the power source and a threshold value, the voltage regulator to be coupled between the logic and one or more loads, wherein the logic is to comprise a buck-boost converter coupled between the power source and the one or more loads, wherein the buck-boost converter is capable of generation of an output voltage that is either greater than or less than an input voltage to the buck-boost converter, wherein the buck-booster converter is to be enabled based at least in part on a comparison of a detected input current at an input to the buck-boost converter against an input current threshold value, wherein the voltage regulator is to be turned off in response to a determination that the priority of the voltage regulator is a lowest priority amongst a plurality of voltage regulators and that the power source is incapable of generating a threshold voltage level, wherein the comparison of the output of the power source and the threshold value is to be delayed for a first time period after the voltage regulator is turned off, wherein the output of the power source is to vary over a second time period that causes the one or more loads to become inoperational.

24. The system of claim 23, wherein the logic is to detect both available power level of the power source and the total load demand of the one or more processor cores.

25. The system of claim 23, wherein the comparison is to be performed periodically.

26. The system of claim 23, further comprising one or more Direct Current (DC) to DC converters to supply the power from the power source to the one or more processor cores.

27. The system of claim 23, wherein the comparison is to be performed without having to disconnect the power source.

28. The system of claim 23, comprising logic to convert DC voltage to DC voltage, wherein the comparison is to be performed based on power loading of the one or more processor cores and voltage rating of the logic to convert DC voltage to DC voltage, and independent of the power source.

* * * * *